(12) United States Patent
Roberts et al.

(10) Patent No.: US 6,975,649 B1
(45) Date of Patent: Dec. 13, 2005

(54) HYPER-CONCATENATION ACROSS INDEPENDENT POINTER PROCESSORS

(75) Inventors: Kim B. Roberts, Nepean (CA); Ronald J. Gagnon, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/577,814

(22) Filed: May 25, 2000

(51) Int. Cl.[7] ................................................ H04J 3/04
(52) U.S. Cl. ..................... 370/470; 370/506; 370/536
(58) Field of Search ................................ 370/366, 373, 370/376, 392, 401, 465, 470, 471, 466, 474, 370/477, 536, 538, 540, 542–544, 690.7, 370/503, 506; 398/81, 98, 142, 154

(56) References Cited

U.S. PATENT DOCUMENTS

| | | | | |
|---|---|---|---|---|
| 5,168,494 A | | 12/1992 | Mueller ........................ 370/84 |
| 5,257,261 A | * | 10/1993 | Parruck et al. ............. 370/522 |
| 5,331,641 A | * | 7/1994 | Parruck et al. ............. 370/506 |
| 5,455,832 A | * | 10/1995 | Bowmaster .................. 714/712 |
| 5,461,622 A | * | 10/1995 | Bleickardt et al. .......... 370/470 |
| 5,537,405 A | * | 7/1996 | Yoshifuji ..................... 370/536 |
| 5,710,650 A | | 1/1998 | Dugan ......................... 359/133 |
| 6,002,692 A | | 12/1999 | Wills ........................... 370/465 |
| 6,094,440 A | * | 7/2000 | Sugawara et al. ........... 370/465 |
| 6,160,819 A | * | 12/2000 | Partridge et al. ............ 370/474 |
| 6,266,345 B1 | * | 7/2001 | Huang ......................... 370/468 |
| 6,731,656 B1 | * | 5/2004 | Slater et al. ................. 370/536 |

FOREIGN PATENT DOCUMENTS

| | | | | |
|---|---|---|---|---|
| CA | 2 337 742 | | 10/2001 | .......... H04B 10/20 |
| EP | 0 718 996 A2 | | 6/1996 | ............. H04J 3/16 |
| EP | 0 996 246 A2 | | 4/2000 | ............. H04J 3/16 |
| EP | 1 011 220 A2 | | 6/2000 | ............. H04J 3/07 |
| EP | 1 143 650 A1 | | 10/2001 | ............. H04J 3/00 |

* cited by examiner

Primary Examiner—Alpus H. Hsu
Assistant Examiner—Daniel Ryman
(74) Attorney, Agent, or Firm—Kent Daniels; Ogilvy Renault LLP (57) ABSTRACT

A concatenated signal carrying an arbitrary mix of concatenated data traffic is split and transported across a network between a start node and an end node through a hyper-concatenated connection set up through independent pointer processor state machines. At a start node, the concatenated optical signal is split into two or more hyper-concatenated data streams. If a split occurs at a frame within a concatenated signal, the start node replaces a concatenation indicator of the frame with a payload pointer from a first frame of the concatenated signal and inserts a split indicator in the SS bits of the frame overhead. At an end node, the hyper-concatenated data streams are recombined to recover the original concatenated signal. Frames containing split indicators are modified to remove the split indicator and to replace the payload pointer with a concatenation indicator.

38 Claims, 5 Drawing Sheets

HYPER-CONCATENATION ACROSS INDEPENDENT POINTER PROCESSORS

CROSS-REFERENCE TO RELATED APPLICATIONS

This application is related to co-pending and co-assigned U.S. patent application Ser. No. 09/539,707 filed on Mar. 31, 2000, entitled METHOD AND SYSTEM FOR ESTABLISHING CONTENT-FLEXIBLE CONNECTIONS IN A COMMUNICATIONS NETWORK, and U.S. patent application Ser. No. 09/522,593 filed on Apr. 19, 2000, entitled HYPER-CONCATENATION ACROSS MULTIPLE PARALLEL CHANNELS, which are both hereby incorporated herein by reference.

MICROFICHE APPENDIX

Not applicable.

TECHNICAL FIELD

The present invention relates to optical communications networks, and in particular to a method for transporting a high-bandwidth, arbitrarily concatenated signal through an end-to-end hyper-concatenated connection incorporating multiple independent channels.

BACKGROUND OF THE INVENTION

Co-pending and co-assigned U.S. patent application Ser. No. 09/539,707 filed on Mar. 31, 2000, and entitled METHOD AND SYSTEM FOR ESTABLISHING CONTENT-FLEXIBLE CONNECTIONS IN A COMMUNICATIONS NETWORK teaches a technique for establishing an open connection (OP-N), mapped across a communications network. The OP-N connection is "concatenatable", in that an end user can transport arbitrarily concatenated signal traffic through the OP-N connection. In principle, virtually any combination of concatenated and non-concatenated signals may be used, up to the bandwidth capacity of the OP-N connection. The traffic mixture (i.e., the mix of concatenated and non-concatenated traffic) conveyed through the OP-N connection can be selected by the end user to satisfy their requirements, and may be changed by the end user as those requirements change, without requiring re-configuration of the OP-N connection. For example, with an OP-60 connection (i.e. N=60, so that the connection has a bandwidth capacity equivalent to an Optical Carrier OC-60 signal) an end user could arbitrarily change from a traffic mix of five STS-12c signals to one OC-48c and 12 (unconcatenated) STS-1 signals or two STS-24 and two STM-4 signals as required. Other traffic combinations are also possible, all at the discretion of the end user, and without intervention from a network service provider.

A limitation of the OP-N connection is that, although it can incorporated multiple channels, in general, the bandwidth of the highest capacity channel (e.g. a wavelength in a Wave Division Multiplexed—WDM, or Dense Wave Division Multiplexed—DWDM network) limits connection size. Thus, if the highest capacity channel of the OP-60 connection operates at a bit-rate of 2.488 GHz, then an OC-48c is the largest connection that can be supported by the OC-60.

However, it may be desirable to transport high bandwidth signals that exceed the capacity of any one channel of an OP-N connection. For example, it may be desirable to transport an OP-192 signal (which would require a line rate of 9.953 GHz to be carried on a single channel), or higher, using an OP-N connection in which the maximum line rate of any one channel is only 2.488 GHz.

Inverse multiplexing, in which a higher rate signal is distributed across several lower rate signals and then recombined at an end node, is known in the art. For example, U.S. Pat. No. 6,002,692 (Wills) teaches a system in which a higher rate Synchronous Optical Network (SONET) signal (e.g. an OC-48c at a 2.488 GHz line rate) is inverse multiplexed into multiple Asynchronous Transfer Mode (ATM) cells that are then transported across a switch fabric through respective ports at a lower rate (e.g. 622 MHz). In cases where data of a single SONET frame is carried within two or more ATM cells, each of the cells is provided with a respective sequence number so that the cells can be placed into the correct sequence for reassembly of the original SONET frame.

The system of Wills is typical of packet-based inverse-multiplexing methods, in that it requires a significant amount of processing to separate the SONET frame into ATM cell payload; formulate ATM cell headers with assigned sequencing numbers; and then re-sequence the ATM cells prior to reassembly of the SONET frame. Such systems are not easily implemented at multiple gigabits per second line rates. Furthermore, such packet-based methods are not relevant to concatenation of SONET signals, where the lower-rate signals are SONET signals.

U.S. Pat. No. 5,710,650 (Dugan) teaches a system in which a high data rate OC-192 signal (at a 9.953 GHz line rate) is inverse multiplexed into four lower rate OC-48 signals (at a 2.488 GHz line rate) which are transported through respective parallel channels (wavelengths). The lower line rate within each channel provides increased dispersion tolerance, so that longer fiber spans can be used without regeneration of the signals. Misalignment between the OC-48 signals (due to the differing propagation speeds of the four wavelengths) is resolved by processing each of the OC-48 signals in parallel to extract their respective 48 STS-1 signals (each having a 51.840 MHz line rate). These STS-1 signals are then individually buffered and processed in parallel to eliminate any misalignment. Treating the signals in this way dramatically reduces the amount of misalignment which needs to be eliminated (in terms of the number of bits) and so reduces the required length of each realignment buffer. However, the parallel circuits required for independently processing each of the STS-1 signals at the low 51.840 MHz line rate greatly increases the cost of the processing circuitry, and imposes severe restrictions on the available concatenation schemes.

A further limitation of the above-noted prior art systems is that, in order to maintain arbitrary concatenatability within a multi-channel connection, it is necessary to maintain precise alignment of the payload data being transported by the data streams within their respective channels, so that the high-bandwidth signal can be reassembled at an end node. None of the prior art systems provides an efficient and reliable means of maintaining this precise alignment with an arbitrary traffic mixture.

Co-pending and co-assigned U.S. patent Application Ser. No. 09/522,593, filed Apr. 19, 2000, and entitled HYPER-CONCATENATION ACROSS MULTIPLE PARALLEL CHANNELS, teaches a method for aligning two or more data streams being conveyed within respective parallel channels. In this system, data signals (which may comprise an arbitrary mixture of concatenated and non-concatenated signal traffic) are inverse-multiplexed and transported hop-by-hop through a hyper-concatenated connection distributed across multiple parallel hyper-concatenated channels. At a downstream end of each hop (including at the end node), the hyper-concatenated data streams are aligned by a signal processor having a plurality of parallel interconnected channel processors. At the end node of the hyper-concatenated connection, the original data signals are recovered from the hyper-concatenated data streams.

In this context, the terms "hyper-concatenation" (used as a noun) and "hyper-concatenated connection", refer to a multi-channel communications path that supports an arbitrary mixture of concatenated and unconcatenated signal traffic and a maximum connection size equal to the total bandwidth capacity of all of its member channels. When used as a verb, the term "hyper-concatenation" refers to either: a process of setting-up a hyper-concatenation (that is, designating member channels of the hyper-concatenated connection, and roles of each member channel); or to a process of inverse-multiplexing data signals for transport through the hyper-concatenated connection.

The term "hyper-concatenated channel" refers to a member channel of a hyper-concatenated connection. These channels are associated such that: a maximum difference in propagation delays of payload data through each of the channels is within a predetermined tolerance; and, at least at opposite ends of the hyper-concatenation, the channels are physically adjacent, and channel ordering is identical. Similarly, the term "hyper-concatenated data stream" refers to a data stream within a hyper-concatenated channel. It will be appreciated that the hyper-concatenated data streams within any one hyper-concatenated connection are sourced from a common point (a "start" node) in a communications network, and thus have substantially equivalent data and frame rates. However, hyper-concatenated data streams may well have differing propagation delays and independent timing jitter.

"Parallel channels" are channels of the communications network in which channel ordering is identical (at least at each end of a connection), and within which respective data streams are not subject to independent pointer processing.

Thus in the above-referenced co-pending application, bit-wise alignment between hyper-concatenated data streams in respective parallel hyper-concatenated channels is re-established at the downstream end of each hop. Bit-wise alignment of payload data within each data stream is maintained by conventional parallel pointer-processing (e.g. by passing stuff indications etc. between pointer processor state machines for adjacent channels) within each node participating in the hyper-concatenated connection.

A limitation of this method is that each node in the hyper-concatenated connection must be equipped with a signal processor for aligning the hyper-concatenated data streams. As a result, legacy Add/Drop multiplexers and cross-connects cannot participate in an end-to-end OP-N connection that includes a hyper-concatenation. In addition, the hyper-concatenated connections cannot be larger than the capacity of any node in the path because the connection cannot be split into parallel data streams processed by independent pointer processor state machines. This restriction limits the ability to deploy OP-N connection related services in the current optical network space.

Accordingly, a method for transporting arbitrarily concatenated signal traffic through a hyper-concatenated connection across independent pointer processors is highly desirable.

SUMMARY OF THE INVENTION

An object of the present invention is to provide a method and system for transporting concatenated signal traffic through a hyper-concatenated connection that traverses independent pointer processor state machines.

Another object of the invention is to provide a method and system for transporting signal traffic across a network which permits dynamic changes in concatenation of data traffic within a concatenated derived signal.

Accordingly, an aspect of the present invention provides a method of transporting a concatenated input signal across an optical network space using derived signals transmitted over a hyper-concatenated connection between a start node and an end node in the optical network space. The method comprises steps of receiving the concatenated input signal at the start node and splitting the concatenated input signal into a plurality of derived signals. The derived signals are transmitted over a predetermined number of independent channels, at least one of the independent channels being routed through a pointer processing state machine that is independent of a pointer processing state machine through which another one of the independent channels are routed. The derived signals are recombined at the end node to form a concatenated output signal equivalent to the concatenated input signal. The concatenated output signal is output from the end node at a signal phase that is arbitrarily related to a signal phase of the derived signals.

The independent channels in the hyper-concatenated connection are processed by adjacent pointer processors in the start node and the end node, and the channel order is identical at the start node and the end node. Furthermore, a maximum latency between the derived signals received at the end node on channels of the hyper-concatenated connection is less than a predetermined time interval. The predetermined interval is preferably less than a time period required to receive a frame from one of the derived signals at the end node.

The concatenated input signal may comprise an arbitrary mix of concatenated and unconcatenated Synchronous Optical Network (SONET)/Synchronous Digital Hierarchy (SDH) signals. When the concatenated input signal is split into the plurality of derived signals, frame overhead of each frame of the concatenated input signal is inspected to determine whether the frame overhead contains a payload pointer or a concatenation indicator. If the frame overhead contains a payload pointer, the payload pointer is stored in a memory. The SS bits of an H1 byte of the overhead portion of the frame are also set to a default value so that the SS bits can be used to indicate a split in a concatenated signal. Each channel of the hyper-concatenated connection transports a predefined number of frames. Consequently, the concatenated input signal is dynamically split into the derived signals, and each derived signal is launched over an independent channel. If a particular frame is to be transmitted over the next independent channel, the frame overhead is examined to determine whether it contains a concatenation indicator, and if the frame overhead contains a concatenation indicator, the concatenation indicator is replaced with the stored payload pointer, and the SS bits are modified to indicate a split in a concatenated signal.

The derived signals are recombined at the end node to form a concatenated output signal. The overhead of each frame of the derived signals is examined to determine whether a frame includes a split indicator. If the frame includes a split indicator, the payload pointer in the overhead is replaced with a concatenation indicator. The payload data of the frames is then read out in alignment across all of the channels of the hyper-concatenated connection to output the concatenated output signal.

When the payload data is read out, one of the data steams (which consists of a stream of derived signals) in the hyper-concatenated connection is designated a reference data stream. All other data steams of the hyper-concatenated connection are designated as slaves to the reference data stream. The payload data of the reference data stream is read from a reference alignment buffer so that a position of a reference read pointer permits corresponding payload data to be read simultaneously from each slave data stream. The alignment buffers have a predetermined storage capacity based on an anticipated maximum difference between propagation delays of the respective derived signals. Preferably, the anticipated maximum difference between propagation delays of the respective derived signals is less than a time interval required to receive one of the frames at the end node. The alignment buffers are preferably adapted to store approximately twice the data that is received during the anticipated maximum difference between propagation delays of the respective frames of each derived signal.

The invention also provides a network node adapted to function as a start node for a hyper-concatenated connection across an optical network space routed through at least one independent pointer processing state machine. The network node comprises an input port adapted to receive a concatenated input signal, a signal processor adapted to inverse-multiplex the concatenated input signal across channels of the hyper-concatenated connection, and an output port adapted to launch the inverse-multiplexed concatenated input signals across the network space as hyper-concatenated data streams within respective ones of the channels.

The signal processor comprises means for identifying each frame within the concatenated input signal that satisfies a condition (p*M)+1, for integers p, in order to determine a split location for the concatenated input signal. The signal processor is also adapted to modify each frame that satisfies the condition if an overhead of the respective frame includes a concatenation indicator. The signal processor is also adapted to select a channel for transporting a frame that satisfies the condition, and each subsequent frame until a next frame satisfies the condition. The means for modifying the frames that satisfy the condition is preferably a pointer processor. The pointer processor is adapted to modify the frames having an overhead that includes a concatenation indicator by inserting a split indicator into a predetermined location within the frame overhead, and replacing the concatenation indicator with a stored payload pointer extracted from an overhead of a first frame of a concatenated signal that includes the frame meeting the condition. The signal processor is adapted split the concatenated input signal in real-time as the concatenated input signal is received by the network node. The split indicator is inserted by assigning a predetermined value to SS bits of an H1 byte of an overhead portion of the frame.

The invention further provides a network node adapted to function as an end node for a hyper-concatenated connection routed through independent pointer processing state machines. The network node comprises an input port adapted to receive hyper-concatenated data streams from adjacent optical channels, a signal processor adapted to combine the hyper-concatenated data streams into a concatenated output signal, and an output port adapted to transmit the concatenated output signal to a downstream node. The signal processor preferably comprises an alignment buffer adapted to buffer payload data from each hyper-concatenated data stream. A pointer processor detects a frame received in a respective data stream and determines a location of payload data in the frame. A read controller responsive to the pointer processor reads the buffered payload data in an aligned condition across the channels of the hyper-concatenated connection into the concatenated output signal.

The pointer processor further comprises a signal monitor adapted to monitor at least an overhead portion of the respective frames, and means for determining whether the overhead portion contains a split indicator.

The end node also comprises a control means adapted to designate one of the hyper-concatenated data steams as a reference data stream, and to designate all others of the hyper-concatenated data steams as slave data streams. The reference read controller is adapted to control a reference read operation for reading payload data of the reference data stream from a respective reference alignment buffer so that payload data from each of the slave data streams can be read by respective slave read operations in alignment with the reference data stream. The read controller is also preferably adapted to replace a payload pointer in a received frame with a concatenation indicator if an overhead of the received frame contains a split indicator.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

This invention relates to a method of transporting an arbitrary mix of optical signal traffic across a network space between a start node and end node using a hyper-concatenated connection routed through independent pointer processing state machines. A concatenated signal is received at the start node and split into a plurality of derived signals. The derived signals are transmitted over a predetermined number of independent channels. At least one of the independent channels is routed through a pointer processing state machine that is independent of a pointer processing state machine through which another of the independent channels are routed. The independent pointer processing may cause the derived signals to lose their initial frame alignment. At the end node, the derived signals are recombined to form an aligned concatenated output signal equivalent to the concatenated input signal.

The invention further relates to network nodes adapted to serve as start nodes or end nodes for hyper-concatenated connections in accordance with the invention. The start nodes have input ports adapted to receive concatenated input signals, and signal processors adapted to inverse multiplex the concatenated input signal across the channels of the hyper-concatenated connection. The start node also has output ports adapted to launch the inverse-multiplexed input signal across the network space as hyper-concatenated data streams within respective ones of the channels. The network nodes adapted to function as end nodes have input ports adapted to receive hyper-concatenated data streams from adjacent optical channels. The received signals are written to respective read buffers in adjacent pointer processor state machines that include adjustable read pointers that permit frames received from the respective hyper-concatenated data streams to be read out in alignment to reconstruct the concatenated signal.

Figure 1:
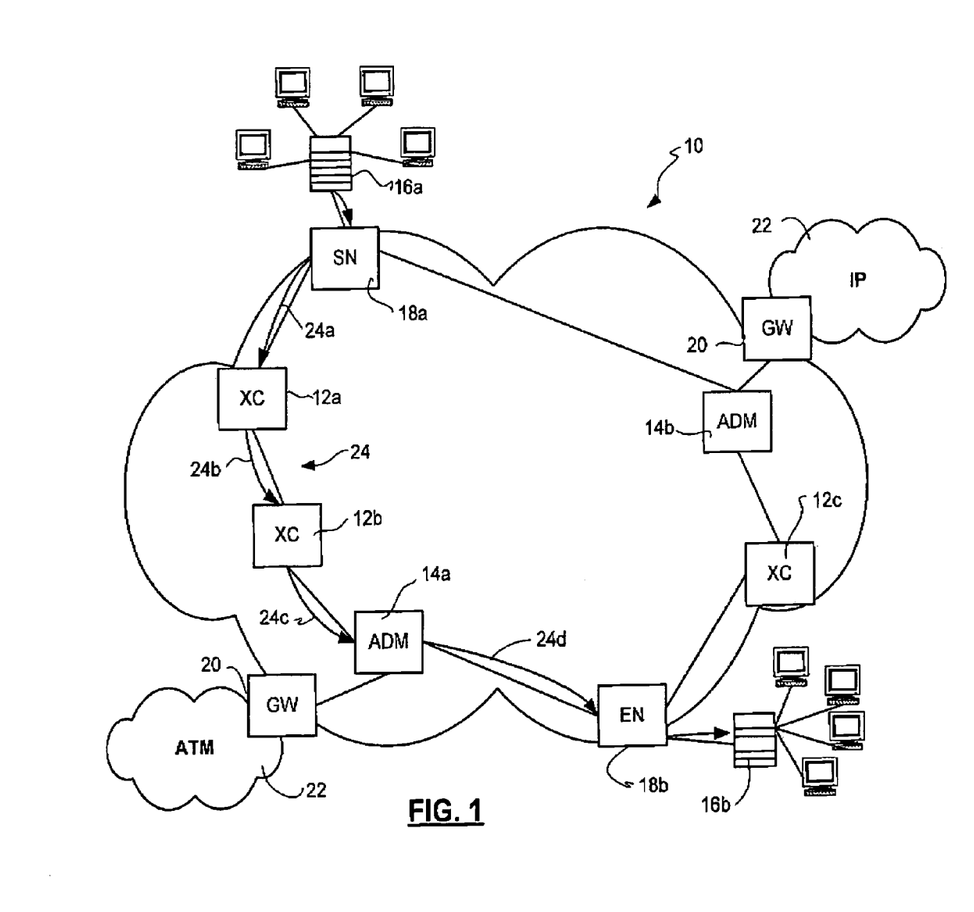
FIG. 1 is a block diagram illustrating an optical communications network usable in conjunction with an embodiment of the present invention.

FIG. 1 is a schematic diagram of an optical network 10 in which the present invention may be deployed. The optical network 10 includes a plurality of nodes which may be, for example, optical cross-connects 12a–c or optical routers 14a–b. Communications devices 16a,16b, for example, concentrator access switches or service provider routers, may be connected to the optical network via one or more edge nodes 18a, 18b configured and equipped to function in accordance with the invention. The optical network 10 may also be connected to one or more associated networks 20, for example an asynchronous transfer mode (ATM) or an internet protocol (IP) network, through a respective gateway 22. Each of the optical cross-connects 12a–c, ADMs 14a,b, and edge nodes 18a, 18b are configured for wave division multiplex (WDM) and/or dense wave division multiplex (DWDM) transport of data traffic, as will be described below in greater detail.

The present invention enables transport of high-bandwidth, arbitrarily concatenated signals through a hyper-concatenated OPen (OP-N) connection 24, hereinafter referred to as a hyper-concatenated connection 24, mapped across at least a part of a communications network 10 between a start node 18a and an end node 18b, via the cross-connects 12a,b and Add/Drop multiplexer (ADM) 14a. At least one of the optical cross-connects 12a,b and ADM 14a performs independent pointer processing on data frames transferred over the hyper-concatenated connection 24. The hyper-concatenated connection 24 has a bandwidth capacity equivalent to N STS-1 signals. Within that bandwidth capacity, arbitrary signal concatenation is supported. The hyper-concatenated connection includes four hops 24a–24d, each of which is supported by a respective node pair, for example start node 18a—optical cross-connect 12a, etc. In a WDM (or DWDM) network, each channel is an optical wavelength used for transport of data traffic between nodes. Within each hop, the channels of a hyper-concatenated connection may be multiplexed together and launched through a single optical fiber, or distributed over two or more parallel optical fibers. Within each node, the channels are demultiplexed, processed and then routed to a downstream hop on a per/channel basis. The wavelength used to convey each channel may be the same or different for each successive hop 24a–d of the hyper-concatenated connection 24. In the example shown in FIG. 1, the source node 18a and the end node 18b are located at respective edges of the optical network. The intervening optical cross-connects 12a,b and the ADM 14a are used to support the OP-N connection. As noted above, at least one of the optical cross-connects 12a,b and the ADM 14a is not large enough to fully support the hyper-concatenated connection as described in Applicant's co-pending patent application referenced above.

Figure 2:
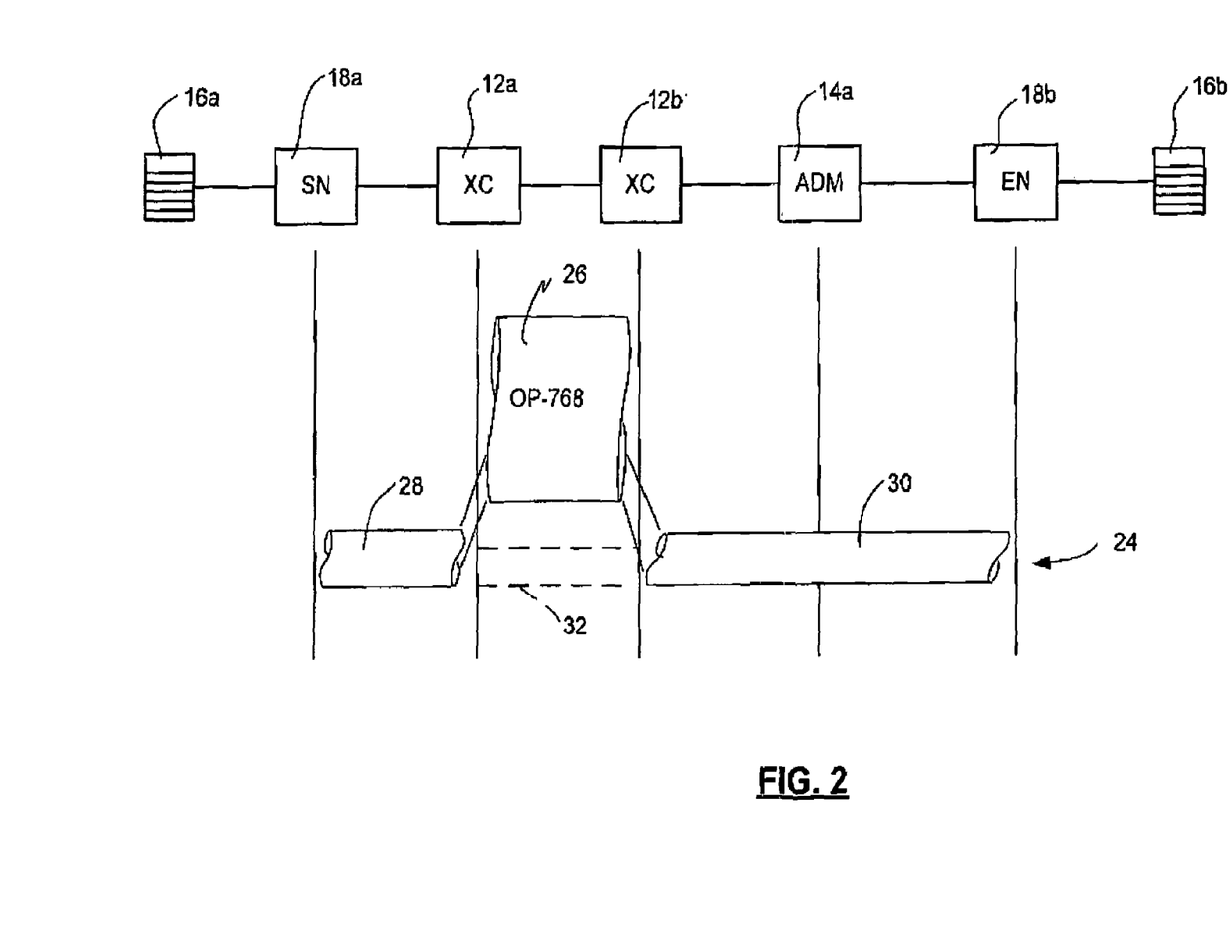
FIG. 2 is a schematic diagram illustrating the set-up of the end-to-end OP-N connection illustrated in FIG. 1.

FIG. 2 is a schematic diagram illustrating a representative set-up of the hyper-concatenated connection 24 mapped between the source and end nodes 18a and 18b. In the illustrated embodiment, the hyper-concatenated connection 24 is an OP-192 connection, thus having a bandwidth equivalent to N=192 STS-1 signals. Within this connection, signal concatenation is not provisioned, so that an arbitrary concatenation scheme (up to the bandwidth capacity of the hyper-concatenated connection) can be defined by an end user. As shown in FIG. 2, the hyper-concatenated connection 24 may be constructed using a layered model. For example, the network service provider may elect to set up high bandwidth OP-N core connections between cross-connects 12a, 12b within the core of the network. In the illustrated example, these high bandwidth core connections include an OP-768 core connection 26 set up between the first and second cross-connects 12a and 12b. The hyper-concatenated connection 24 is set up, for example, by a network service provider in response to a request from an end user for an end-to-end open connection having a bandwidth of N=192. Setting up this end-to-end open connection requires that the network service provider establish feeder OP-192 connections 28 and 30 between the start node 18a and the first cross-connect 12a, and between the second cross-connect 12b and the end node 18b. These feeder OP-192 connections 28,30 are then linked by a virtual OP-192 connection 32 which is set up by allocating a portion of the bandwidth of the OP-768 core connection 26 previously established between the two cross-connects 12a and 12b.

As explained above, at each node 12a,b, 14a intermediate the start node 18a and the end node 18b, each of the derived signals 44 may be pointer processed in a conventional manner by independent pointer processing state machines. Because the SS field in the frame overhead is generally unused, the split indicator passes through each pointer processing state machine unchanged, so that signaling is preserved. It will be appreciated that any other location within the frame may be used to store the split indicator, provided that the selected location is passed through each pointer processor state machine unchanged. An advantage of using the SS field is that this location avoids incurring signaling delay or misconnection of the signals.

Throughout the length of the end-to-end hyper-concatenated connection 24, a predetermined number of channels are utilized. High bandwidth data traffic originating at the communications device 16a is inverse-multiplexed across the hyper-concatenated channels of the hyper-concatenated connection 24, at the start node 18a, and launched as hyper-concatenated data streams through the hyper-concatenated connection 24. Each channel of the hyper-concatenated connection 24 carries a respective hyper-concatenated data stream. Two or more hyper-concatenated channels may be multiplexed within a single waveguide (e.g. optical fiber) or distributed over two or more waveguides. At the end node 18b the hyper-concatenated data streams are recombined to recover the original high bandwidth concatenated signal. This inverse-multiplexing and recovery process is preferably transparent to service users.

Channel selection for the hyper-concatenated connection 24 involves selecting a set of candidate channels for the hyper-concatenated connection 24, and then validating each of the candidate channels for use as hyper-concatenated channels. The channels are "independent" in that the respective data streams may be subject to independent pointer processing at any intermediate nodes between the start node 18a and the end node 18b. Thus in the illustrated embodiment, the optical cross-connects 12a,b and the ADM 14a can be legacy optical nodes. Exemplary criteria used for validating each of the candidate channels include:

- each of the channels must be adjacent, in that they are processed by physically adjacent, interconnected pointer processor state machines within the start and end nodes 18a and 18b. Processing hyper-concatenated signals through physically adjacent pointer processor state machines has the advantage of minimizing signal propagation delays for synchronization signals across the channels of the hyper-concatenated connection 24;
- channel ordering, within both the start and end nodes 18a and 18b must be identical. For example, consider a hyper-concatenated connection 24 incorporating Q=4 channels labeled CH(1)–CH(4) at the start node 18a, and CH(a)–CH(d) at the end node 18b. This criterion means that the channel order is the same at both ends of the connection 24, so that CH(1) corresponds to CH(a); CH(2) corresponds to CH(b); CH(3) corresponds to CH(c); and CH(4) corresponds to CH(d). This ensures that frame mis-ordering is prevented during recovery of the signal at the end node 18b; and
- a maximum difference in signal propagation delay between the channels, end-to-end between the start node 18a and the end node 18b, must not exceed a predetermined tolerance to ensure that a high bandwidth signal multiplexed across multiple channels can be reliably recombined. In general, the propagation delay should not exceed the time required to receive one frame at the end node 18b. If the signal propagation delay causes a mis-alignment that is greater than about one frame, the association between frames of different channels becomes ambiguous. This ambiguity can only be resolved by super-frame information in the frame overheads. Handling such a large delay is difficult in real time at line rates in the GHz range. Accordingly, it is preferable that the signal latency is at most about the time required to transmit one frame.

Assignment of the channels to the hyper-concatenated connection 24 involves setting appropriate parameters in each of the start node 18a and end node 18b, to enable channel selection and coordination between the pointer processor state machines participating in the hyper-concatenated connection 24. Exemplary parameters for each of the start node 18a and end node 18b are discussed below in greater detail.

Each hyper-concatenated channel has a maximum bandwidth capacity that is dictated by its line rate. The capacity of a hyper-concatenated connection can be expressed in terms of a number M (where M is an integer, M≧1) of concatenated frames of the largest signal that can be transported through the hyper-concatenated channel. Each of the hyper-concatenated channels in the hyper-concatenated connection preferably have the same line rate as this simplifies processing in the start node where the concatenated source signal is demultiplexed, though this is not a requirement. Channels with different line rates may be hyper-concatenated together to provide a hyper-concatenated connection in accordance with the invention. For example, if the hyper-concatenated connection is an OC-192, and each channel of the hyper-concatenated connection 24 runs at a line rate of 2.884 GHz, the value of M is 48 because each channel can transport an OC-48 signal, and Q will be 4, so that an OC-192 signal can be inverse multiplexed and transported as 4 substantially simultaneous OC-48 signals. The process of inverse-multiplexing large bandwidth signals for this purpose will be described below in greater detail.

In general, transport of a high bandwidth signal through the hyper-concatenated connection 24 involves: splitting the high bandwidth signal to create a number of lower bandwidth derived signals; routing each of the derived signals across the network through respective hyper-concatenated channels; and recombining the derived signals at the end node 18b to recover the original high bandwidth signal. Each of these steps is described below with respect to FIGS. 3 through 5.

Splitting the High Bandwidth Signal

The purpose of this step is to inverse-multiplex a high bandwidth concatenated signal originating from the communication device 16a by splitting the high bandwidth signal into a number of derived signals that are distributed across the hyper-concatenated connection 24. The process of splitting a high bandwidth signal is illustrated by way of an example in FIG. 3, and steps in an exemplary process are illustrated in a flow chart in FIG. 4.

Figure 3:
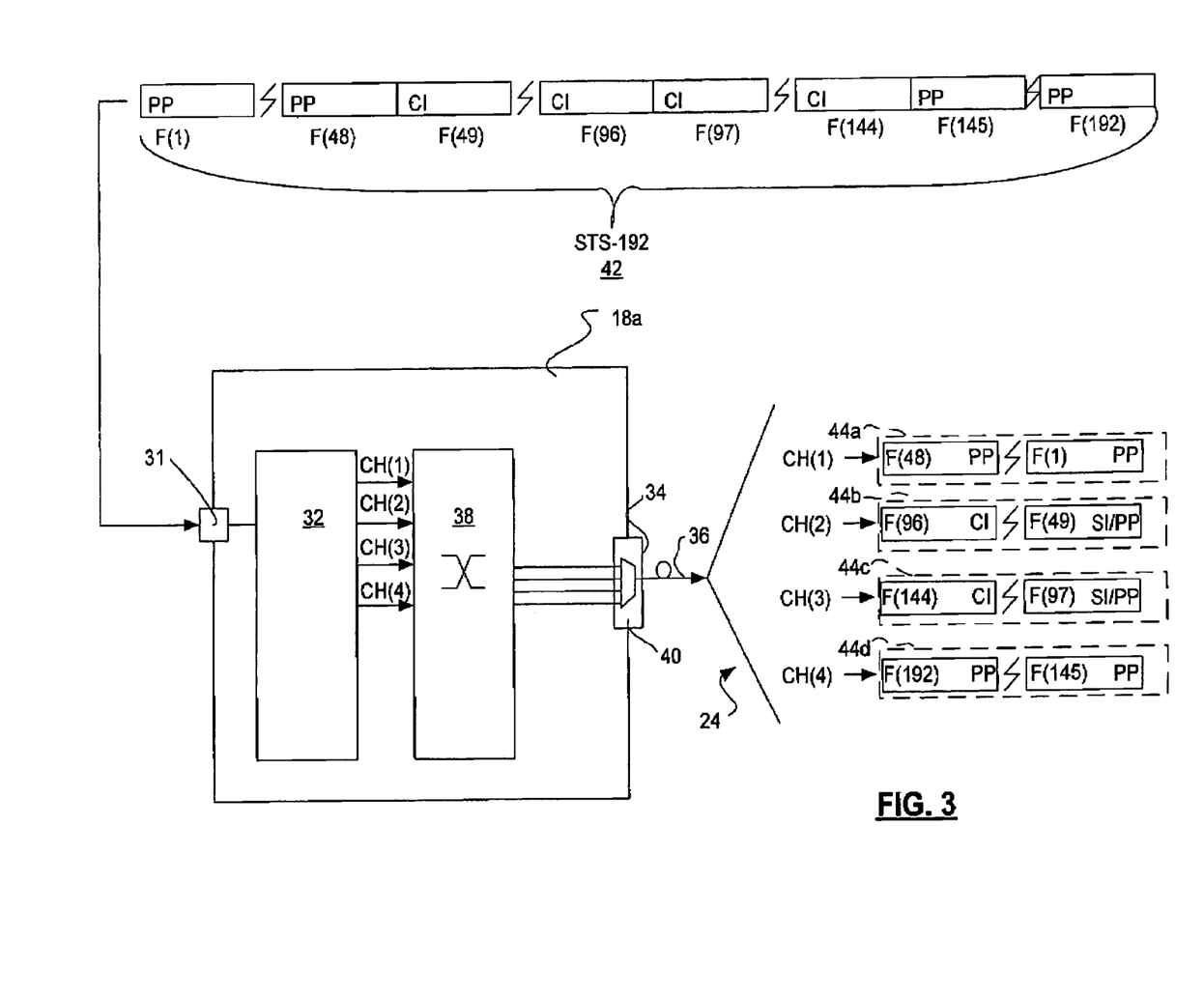
FIG. 3 is a block diagram schematically illustrating a start node in accordance with an embodiment of the present invention.

As shown in FIG. 3, the start node 18a includes at least one input port 31 connected to the communications device 16a; a signal processor 32 for splitting high bandwidth signals across multiple hyper-concatenated channels; at least one output port 34 connected to a respective downstream fiber 36; and a switch fabric 38 for routing each channel from the at least one input port 31 to a respective output port 34. A controller (not shown) controls operation of the start node 18a, including, for example, channel assignment and routing information for each hyper-concatenated connection supported by the start node 18a. The output port 34 includes a multiplexor 40 for multiplexing a plurality of channels onto the respective downstream fiber 36.

In the embodiment shown in FIG. 3 the start node 18a has one input port 31 and one output port 34 for the sake of simplicity in illustration. However, it will be appreciated that the start node 18a is normally provisioned with a plurality of ports, of which one or more may be used for the hyper-concatenated connection 24. It will also be appreciated that the ports of the start node 18a may be configured to handle bi-directional data traffic. However, in order to simplify the present description, and aid understanding of the invention, the embodiment shown in FIG. 3 is equipped with unidirectional ports, one of which (input port 31) is configured to handle inbound signal traffic, and the other (output port 34) is configured to handle outbound signal traffic.

As shown in FIG. 3, the signal processor 32 receives a serial concatenated data stream containing an arbitrary mix of low bandwidth signals and high bandwidth concatenated signals. The serial data stream may be received through a single input port 31, as shown, or may be distributed across two or more ports. The signal processor 32 is designed to process the serial data stream to split the respective signals across the multiple channels of the hyper-concatenated connection 24, in accordance with the channel assignments associated with the hyper-concatenated connection 24. The switch fabric 38 is configured to route data streams on a per-channel basis to the output port 24 for transmission through the hyper-concatenated connection 24. Per-channel routing of data streams through the switch fabric 38, and subsequent multiplexing of channels onto a downstream fiber, are known in the art, and therefore will not be described in further detail.

During set up of the hyper-concatenated connection 24, the following parameters are defined:

the number Q of adjacent channels forming the hyper-concatenated connection 24;

the number M of data frames included in each derived signal that is transported on each channel of the hyper-concatenated connection 24; and the channel ordering sequence by which successive derived signals will be routed to respective channels of the hyper-concatenated connection 24.

In the example shown in FIG. 3, hyper-concatenated connection 24 is configured with Q=4 adjacent channels, which are nominally identified as channels CH(1)–CH(4). The high bandwidth signal 42 originating from the end user's communications device 16*a* is a SONET STS-Kc signal composed of 192 concatenated STS-1 frames (thus K=192), which are nominally identified as F(1)–F(192) This high bandwidth signal 42 is split by the signal processor 32 into four derived SONET signals 44*a*–44*d*, each of which includes 48 of the STS-1 frames. Thus, in the example of FIG. 3, each derived signal is a derived STS-Mc signal, in which M=48.

In general, the high bandwidth signal 42 may include any integer number K of concatenated STS-1 frames, up to any physical limit imposed by the network or the start node 18*a* and end node 18*b*, as will be explained below in more detail. The values of Q and M are generally dictated by the line rate of the channels involved in the hyper-concatenated connection 24. However, in order to ensure compatibility across SONET/SDH platforms, it is preferable to select the value of M to be equal to any one of: 1, 2, or any multiple of 3. Within this preferred range, the values of M and Q are preferably selected such that the product Q×M=K, so that the high bandwidth signal 42 can be evenly split across the channels of the hyper-concatenated connection 24. The values of M and Q are selected at the time of set up of the hyper-concatenated connection 24. The high bandwidth signal 42 received from the end user communications device 16*a* can be split across the Q channels of the hyper-concatenated connection 24 in real time as successive frames F(1)–F(192) are received by the signal processor 32. Exemplary steps in a process of splitting the high bandwidth signal 42 are described below with reference to FIG. 4.

Figure 4:
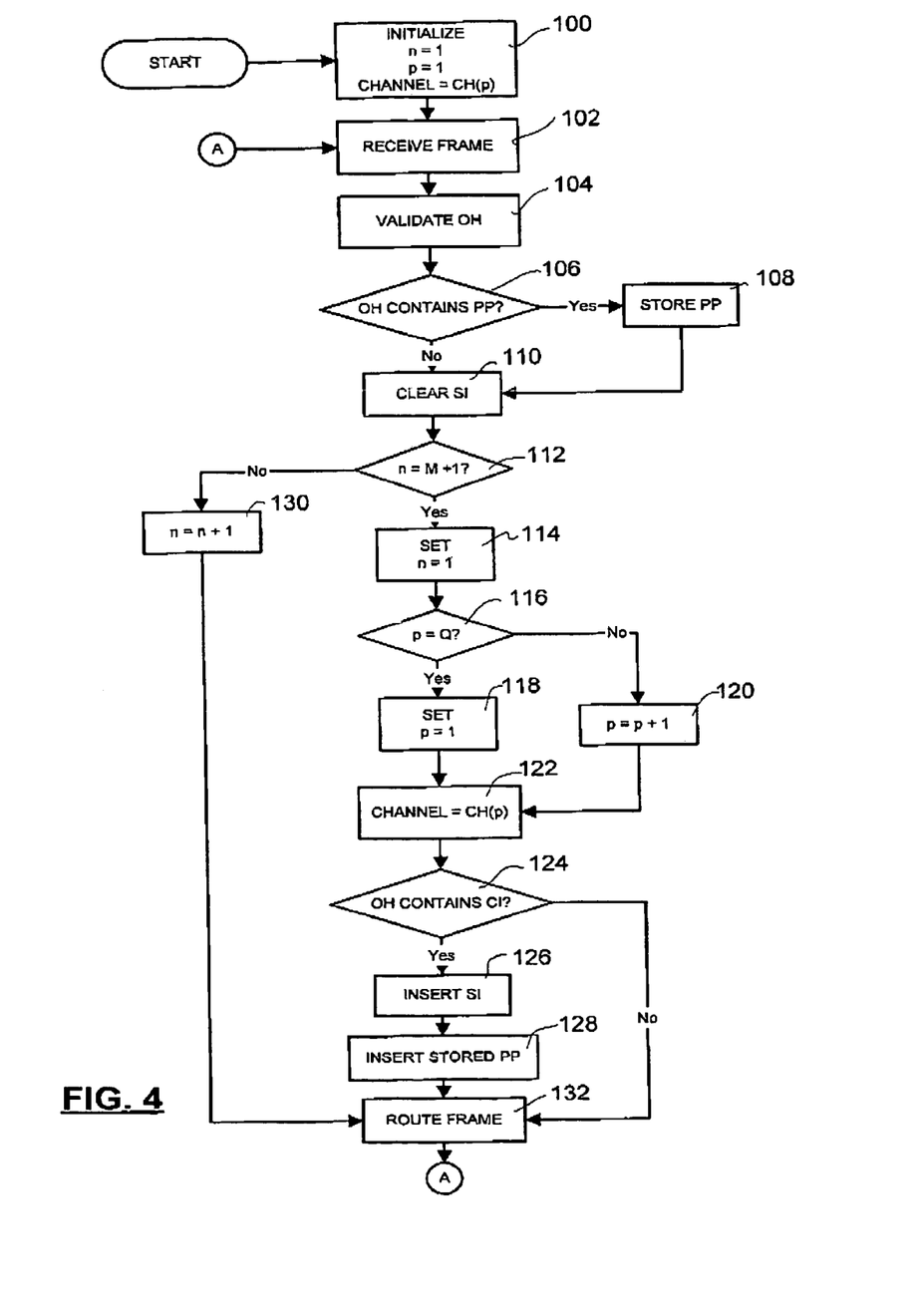
FIG. 4 is a flow chart showing principal steps in a process for splitting a high bandwidth signal in accordance with an embodiment of the present invention.

When the hyper-concatenated connection is set up, a pair of counters n and p (where n represents the frame number within a received high bandwidth signal 42, and p identifies each derived signal) are initialized to n=0 and p=1 respectively (step 100). At the same time, a channel index (CH$_{(p)}$) determined by the value of p is initialized. Upon receipt of a data frame F(1), for example, (step 102), the frame overhead is processed and analyzed to validate the overhead data and pointers (step 104). Upon successful validation of the frame overhead, the frame is examined (step 106) to determine whether the frame overhead contains a payload pointer (PP), indicating that the frame is a first frame in an STS-N concatenation. Following standard SONET frame concatenation rules, the second through Kth frames of an STS-N concatenation within the high bandwidth (STS-Kc) signal 42 will contain a concatenation indicator CI in place of the payload pointer PP. If the frame contains a concatenation indicator, it is ignored, until step 124, as will be explained below in more detail.

As noted above, the high bandwidth signal (STS-Kc) received from the communications device 16*a* may contain an arbitrary, dynamic mix of concatenated data traffic. If it is determined in step 106 that the frame contains a valid payload pointer, the payload pointer is stored in a memory in step 108. Regardless of whether the frame contains a valid payload pointer, the SS bits in the H1 byte of the frame overhead are set to a predetermined default value, binary "00", for example. While the SS field is defined in standard SONET protocol, it is generally not used and thus its value can be altered without corrupting the frame. In accordance with the preferred embodiment of the invention, the SS bits are used as a split indicator, as will also be explained below in more detail.

After the SS bits are initialized in step 110, the variable "n" is compared with M+1 to determine whether the frame should be launched over a current channel indicated by CH(p), or a next channel, (step 112). If n is not equal to M+1, n is incremented by one in step 130 and the frame is routed through the switch fabric 38 to an output port 34 (step 132). If the variable n is equal to M+1, n is set to one in step 114 to indicate that the frame is to be the first frame launched on the next channel of the hyper-concatenated connection. In step 116, p is compared with Q to determine whether the last channel in the hyper-concatenated connection is being used. If p is equal to Q, p is set to 1 (step 118) so that the first channel in the hyper-concatenated connection 24 is used to launch the data frame. If, however, p is not equal to Q, p is incremented by 1 (step 120) to route the data frame to the next channel in the hyper-concatenated connection 24. In either case, the current channel (CHANNEL) is set to the index CH$_{(p)}$ (step 122), to indicate to the signal processor which channel should be used to launch the data frame.

In step 124, the frame overhead is examined to determine whether the payload pointer bits contain a concatenation indicator (CI). If not, the frame is routed to the current channel in step 132. If the frame overhead contains a concatenation indicator, meaning that the frame is a frame in an STS-N concatenation within the STS-Kc signal, a "split indicator" SI is inserted in the SS bits of the H1 byte of the frame overhead.

In order to ensure proper processing of the hyper-concatenated data streams, it is necessary that the insertion of the split indicator SI be accomplished without adding to the length of the overhead or corrupting overhead data. The preferred possibility is to use the SS field within the H1 byte of the frame overhead. While the SS field is defined in standard SONET/SDH protocol, it is generally not used and thus its value can be altered without corrupting the frame. For example, a value of binary 01 can be written to the SS field in step 126 as the split indicator SI. In order to enhance reliability during reconstruction of the high bandwidth signal at the end node 18*b*, a value of binary "00" is written to the SS field of all frames in step 110, as explained above. This ensures that every frame received at the end node 18*b* contains an explicit indication of whether or not it corresponds to a split location of an STS-N signal that is to be reconstructed within the STS-Kc signal. The use of the SS field for this purpose will be described in greater detail below with reference to FIG. 5.

If a split indicator is inserted into the SS bits of the H1 byte of the frame overhead in step 126, the payload pointer (PP) belonging to a first frame in the STS-N concatenation, stored in step 108, is inserted into the frame overhead to replace the concatenation indicator (CI) in step 128. In step 132, the frame is routed through the switch fabric 38 to an output port 34 and the process repeats for a next frame at step 102.

In the example shown in FIG. 3, frames of the first derived signal 44*a* are routed through the switch fabric 38 to channel CH(1) by the signal processor 32. Frames of the second, third and fourth derived signals 44*b* and 44*c*, 44*d* are routed through the switch fabric 38 to channels CH(2), CH(3) and CH(4), respectively, by the signal processor 32. Each of these channels may include respective buffers (not shown) so that each derived signal 44 can be launched through the hyper-concatenated connection 24 substantially simultaneously.

A split location is defined as a location at which the STS-Kc signal 42 must be split in order to form each successive derived signal 44a–d. This can conveniently be defined in terms of the frame number n, as explained above, such that a frame at a split location becomes the leading frame of a corresponding derived signal 44. Thus, each split location corresponds to a frame F(n) for which the frame number n satisfies the equation:

$$n = M \times p + 1, \ 1 \geq p \geq Q.$$

In the present example, M=48, so that split locations of the high bandwidth signal will correspond to the $49^{th}$, $97^{th}$ and $145^{th}$ frames.

As shown in FIG. 3, the result of the processing of each successive frame F(1)–F(192) of the high bandwidth signal 42 is that the high bandwidth signal 42 is split into four derived signals 44a–44d that are output through respective channels CH(1)–CH(4) of the hyper concatenated connection 24. Each of the derived signals 44 are organized as follows:

- the first derived signal 44a contains frames F(1) through F(48) in their original form;
- the second derived signal 44b contains frames F(49) through F(96). If frame 49 is part of an STS-N concatenation and is not the first frame in the STS-N concatenation, an overhead of the frame contains a split indicator (SI), binary "01" in the SS bits of the H1 byte of the frame overhead, and a valid payload pointer (PP) copied from a first frame in the STS-N concatenation. Frames 50–96 are passed through without modification;
- The third derived signal 44c contains frames F(97) through F(144). As is the case in the second derived signal, if frame F(97) is part of an STS-N concatenation, the frame is modified as explained above while the balance of the frames are passed through without modification.
- The fourth derived signal 44d contains frames F(145) through F(192). As is the case in the second and third derived signals, if frame F(145) is part of an STS-N concatenation, the frame is modified as explained above to insert the SI and PP, while the balance of the frames are passed through without modification.

Thus constructed, each derived signal 44 is indistinguishable from a standard SONET/SDH signal STS-M signal (M=48 in this example), and each derived signal may be routed through independent pointer processors, even through different optical fibers provided that the signal skew at the end node 18b is within certain predefined tolerances. However, the presence of the split indicators in the leading frame of each of the derived signals 44b–d, as required, enables reconstruction of the high bandwidth signal at the end node 18b, as will be described in greater detail below. The split indicators must not be corrupted by the intermediate equipment.

Routing Signals Across the Network

As mentioned above, each derived STS-M signal 44a–d is indistinguishable from any standard SONET/SDH signal. Accordingly, each of the derived STS-M signals 44 can be routed across the network 10 between the start node 18a and end node 18b using conventional SONET/SDH routing equipment and methods. Each derived STS-M signal 44a–d can be routed independently, and thus may follow different paths through the network 10 and may be subject to independent pointer processing at intermediate nodes 12a,b, 14a. However, if the split described above were not performed, these signals could not be transported independently as there would be no pointer information, only concatenation indicators at the split locations.

The path followed by each channel is established at the time that the hyper-concatenated connection 24 is set up, and is effectively "nailed up", for the duration of the hyper-concatenated connection. The routing for each path may, in principle, be arbitrary. However, at the end node 18b the channel ordering must be identical to the channel ordering at the start node 18a. Additionally, in order to prevent ambiguity during recombination of the STS-Kc signal, the difference in propagation delay between the payload envelopes within each derived signal 44a–d is preferably less than the time required to receive a frame at the end node 18b. Preferably, the maximum difference in propagation delay between the payload envelopes will not exceed about 125 μSec. In order to realign the payload envelopes that have undergone independent pointer processing, input buffer size at the end node 18b is important, as will be described below in greater detail with reference to FIG. 5.

As explained above, at each node 12a,b,14a intermediate the start node 18a and the end node 18b, each of the derived signals 44 may be pointer processed in a conventional manner by independent pointer processing state machines. Because the SS field in the frame overhead is generally unused, the split indicator passes through each pointer processing state machine unchanged, so that signaling is preserved. It will be appreciated that any other location within the frame may be used to store the split indicator, provided that the selected location is passed through each pointer processor state machine unchanged. An advantage of using the SS field is that this location avoids incurring signaling delay or misconnection of the signals.

The term "independent pointer processing state machine" refers to a pointer processing circuit that is independent from other pointer processing circuits, such that stuff indications or pointer values are not passed from one circuit to the other within the time interval between the receipt of the pointers and a corresponding stuff opportunity. An example of independent pointer processing state machines is two pointer processor circuits contained in respective separate optical receiver units. Another example of independent pointer processing state machines is two pointer processing state machines in a legacy cross-connect or a legacy ADM.

Recombination of the High Bandwidth Signal

Figure 5:
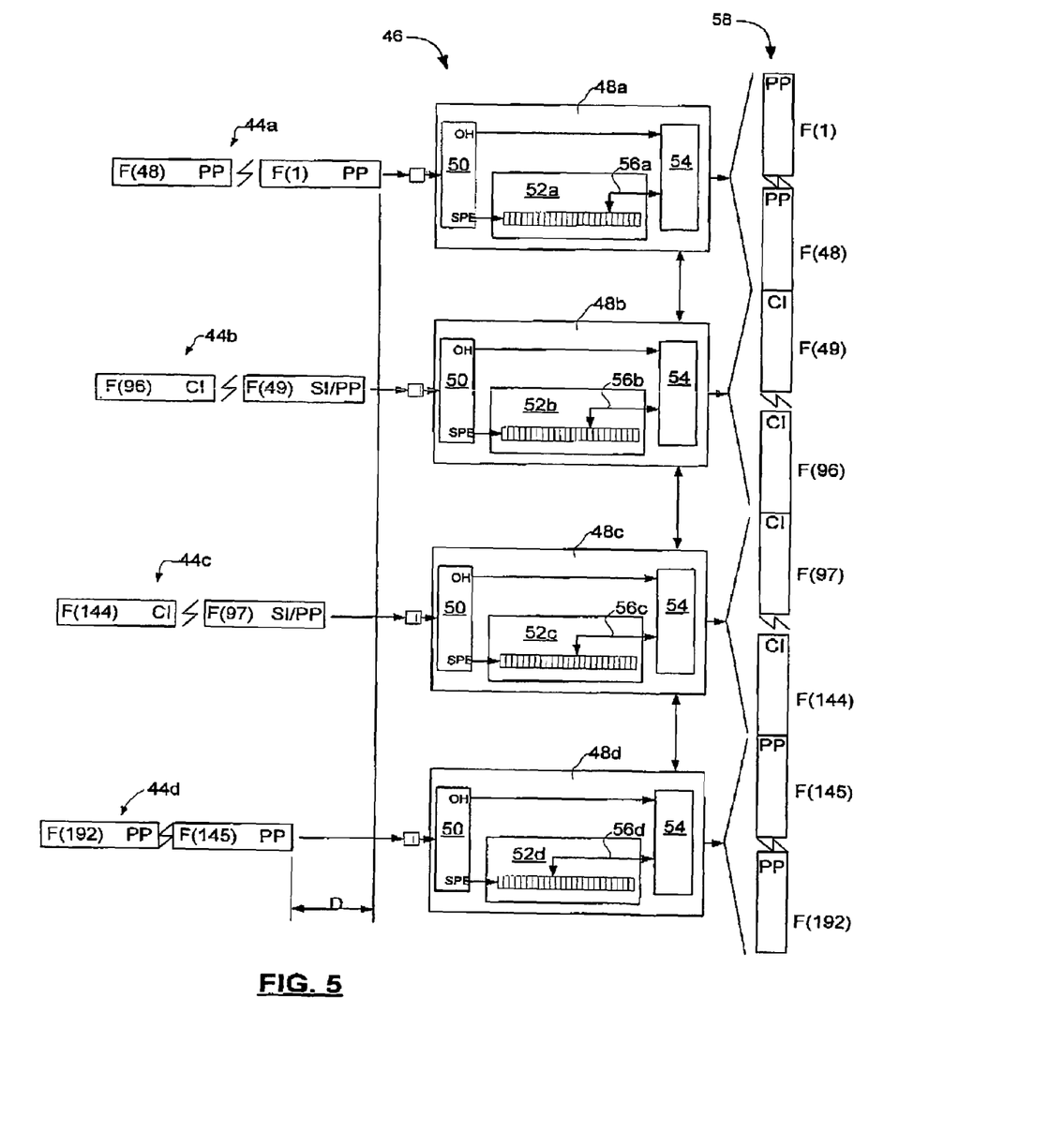
FIG. 5 is a block diagram schematically illustrating operations of an end node in accordance with the present invention.

FIG. 5 is a block diagram schematically illustrating functional components of a signal recombination circuit 46 operatively connected within the end node 18b. As mentioned above, the derived signals 44a–d are received over respective independent channels having the same channel ordering as at the start node 18a. The values of the parameters M and Q are determined at the time of set-up of the hyper-concatenated connection 24, and the channel ordering at the source and end nodes 18a, 18b is identical. Accordingly, frame ordering for reconstruction of the STS-Kc signal is also known at the time of set-up of the hyper-concatenated connection 24 and remains constant, at least for the duration of the hyper-concatenated connection. The signal recombination circuit 46 generally comprises a respective pointer processor state machine 48a–d for each of the parallel channels. The parallel pointer processor state machines 48 are inter-connected to enable synchronous read operations, and to enable pointer values to be propagated across each of the channels forming the hyper-concatenated connection 24. As shown in FIG. 5, each pointer processor state machine 48 generally comprises a framer 50, an alignment buffer 52, and a read processor 54.

The framer 50 operates to pointer process successively received frames in a manner known in the art. In particular, following validation of the frame, the frame overhead is analyzed to identify the first byte of payload data, as well as locations of positive and negative stuffs. Each frame is read into a respective alignment buffer 52. The alignment buffers 52 are preferably first-in-first-out buffers (FIFOs) having an adjustable read pointer 56 to permit compensation for propagation delay between payload frames in the respective hyper-concatenated data streams. As a result, alignment of the frames across the multiple channels of the hyper-concatenated connection 24 can be accomplished by adjusting a location of the respective read pointer 56 of each FIFO participating in the hyper-concatenated connection. Preferably, each alignment buffer 52 has a memory capacity sufficient to store the number of data bytes received during a period of twice the maximum anticipated difference in propagation delay between the respective derived signals 44a–d. In the present example, this translates into the number of bytes received during a period of approximately 250 $\mu$Sec. An additional amount of storage capacity (for example equivalent to a number of bytes received during a period of approximately 2.5 $\mu$Sec) is preferably provided to compensate for arbitrary alignment of incoming and outgoing frames, jitter between read and write clocks, and dead zone to minimize outgoing pointer adjustments.

The read processor 54 operates to construct respective frames of the reconstructed STS-Kc signal. As described above, channel ordering is determined at the time of set up of the hyper-concatenated connection 24 and remains fixed for the duration of the connection. Thus the read pointers 54 operate to construct a set of M aligned frames. If the frame overhead of any one of the frames received contains a split indicator (SI), the SS bits are optionally set to binary "00" and the payload pointer (PP) which replaced the concatenation indicator (CI) in the frame as originally received at the start node 18a is replaced with a concatenation indicator (CI), to restore the frame to its original condition. The frame phase of the reconstructed STS-Kc signal is arbitrary, and will generally be selected to have the same phase as other signals being processed through the end node 18b. In general, data for the reconstructed high bandwidth signal 58 is read from each alignment buffer 52, in parallel, and mapped to a synchronous STS-Kc payload envelope of the high bandwidth signal 58.

In order to align the frames arriving in the independent data streams of the hyper-concatenated connection, one of the channels (in the illustrated example, channel CH(2)) is selected as a reference channel, and the remaining channels of the hyper-concatenated connection 24 are designated as slave channels. The reference channel may be arbitrarily selected, though a channel having a propagation delay in about a middle of the range of propagation delays is preferred. Within the reference pointer processor state machine 48b, the read operation is controlled such that the read pointer 56b is located at approximately the mid point of the alignment buffer 52b. The respective read pointers 56a,56c and 56d in each of the slave pointer processor state machines 48a,48c and 48d are then adjusted to compensate for differences in propagation delay across the network 10. In addition, the read clocks (not shown) in each of the slave pointer processor state machines 48a,48c and 48d are synchronized with that of the reference pointer processor state machine 48b so that each successive payload byte is read substantially simultaneously from each of the FIFOs. Finally, a valid payload pointer PP indicating a location of a first payload byte within each frame, as well as any required stuff indications, are passed from the reference pointer processor state machine 48b to each of the slave pointer processor state machines 48a, 48c and 48d. Thus it will be seen that the high bandwidth signal originating at the communications device 16a and split into multiple derived signals 44 in the start node 18a, is reconstructed in the end node 18b so that it is interpreted at the communications device 16b the same as if the signal were passed directly from communications device 16a to communications device 16b.

In the foregoing description, the start node 18a and end node 18b are located at the network edge, and serve to mediate traffic flows between end-user communications devices 16a,b and the network 10. However it should be noted that the present invention is not limited to this embodiment. One, or both, of the signal processor 32 and signal recombination circuit 46 may, for example, be located in respective nodes 12a–c, 14a–b within the network 10. In particular, the methods and apparatus of the present invention can be used to enable high bandwidth traffic flows within the network core, for example, through the OP-768 connection 26, (see FIG. 2) if the connection is routed through one or more legacy nodes or through independent pointer processing state machines.

The embodiment(s) of the invention described above are therefore intended to be exemplary only. The scope of the invention is therefore intended to be limited solely by the scope of the appended claims.

We claim:

1. A method of transporting an input signal through a hyper-concatenated connection between a start node and an end node in a network, the input signal having a variable user-selected concatenation, the method comprising steps of:

a) receiving the input signal at the start node and splitting the input signal into a plurality of derived signals independently of the concatenation of the input data signal;

b) transmitting the derived signals as hyper-concatenated data streams within respective ones of a plurality of independent channels, at least one of the hyper-concatenated data streams being routed through a pointer processing state machine that is independent of a pointer processing state machine through which another one of the hyper-concatenated data streams is routed; and c) recombining the derived signals at the end node to form an output signal equivalent to the input signal;

wherein splitting the input signal into a plurality of derived signals comprises a step of inspecting an overhead of each frame of the input signal to determine whether the overhead contains a payload pointer or a concatenation indicator.

2. The method as claimed in claim 1 wherein the output signal is output from the end node at a signal phase that is arbitrarily related to a signal phase of the derived signals.

3. A method as claimed in claim 1, wherein the independent channels in the hyper-concatenated connection meet predetermined criteria, comprising:

a) each of the channels is processed by adjacent pointer processors in the start node and the end node;
b) channel order is identical at the start node and the end node; and
c) a maximum latency between the derived signals received at the end node on channels of the hyper-concatenated connection is less than a predetermined time interval.

4. A method as claimed in claim 3, wherein the predetermined time interval is less than a time period required to receive a frame from a one of the derived signals at the end node.

5. A method as claimed in claim 1, wherein the input signal comprises a user- selected mix of concatenated and unconcatenated Synchronous Optical Network (SONET)/ Synchronous Digital Hierarchy (SDH) signals.

6. A method as claimed in claim 1 wherein the method further comprises a step of storing the payload pointer if a payload pointer is found in the overhead.

7. A method as claimed in claim 6 further comprising a step of setting SS bits of an H1 byte of the overhead portion of the frame to a default value.

8. A method as claimed in claim 7, wherein the default value is binary "00".

9. A method as claimed in claim 7 further comprising steps of:
a) comparing a frame count with a predetermined constant to determine if the frame should be transmitted over a next independent channel in the hyper-concatenated connection;
b) if the fame is to be transmitted over the next independent channel, examining the frame overhead to determine whether it contains a concatenation indicator; and
c) if the frame overhead contains a concatenation indicator, replacing the concatenation indicator with the stored payload pointer, and inserting a split indicator into the SS bits.

10. A method as claimed in claim 9 further comprising a step of incrementing the frame count by one if the frame count is not equal to the predetermined constant.

11. A method as claimed in claim 9 wherein if the frame is to be transported over a next independent channel, the method further copses steps of:
a) incrementing a channel index by one unless the channel index equals a number of channels in the hyper-concatenated connection;
b) setting the channel index to one if the channel index equals the number of channels in the hyper-concatenated connection; and
c) transmitting the frame over the independent channel identified by the channel index.

12. The method as claimed in claim 1 wherein the step of recombining the derived signals at the end node to form a concatenated output signal further comprises steps of:
a) examining an overhead of each frame of the derived signals to determine whether the overhead includes a split indicator;
b) if the overhead includes a split indicator, replacing a payload pointer in the overhead with a concatenation indicator; and
c) reading out payload data of the derived signals in alignment across all of the channels of the hyper-concatenated connection to provide the concatenated output signal.

13. A method as claimed in claim 12, wherein the step of reading out the payload data of the derived signals received at the end node comprises steps of:

a) designating a data steam in the hyper-concatenated connection as a reference data stream;
b) designating all other data steams of the hyper-concatenated connection as slaves to the reference data stream;
c) controlling a read operation for reading the payload data of the reference data stream from a reference alignment buffer such that a position of a reference read pointer permits corresponding payload data to be read simultaneously from each slave data stream; and
d) reading the payload data of each slave data stream from respective slave alignment buffers based on the reference read operation, so that payload data of each of the slave data streams is read from the respective slave alignment buffers in alignment with corresponding payload data of the reference data stream.

14. A method as claimed in claim 13 wherein the alignment buffers have a predetermined storage capacity based on an anticipated maximum difference between propagation delays of the respective derived signals.

15. A method as claimed in claim 14, wherein the anticipated maximum difference between propagation delays of the respective derived signals is less than a time interval required to receive one of the frames at the end node.

16. A method as claimed in claim 14, wherein the predetermined storage capacity is sufficient to store a quantity of payload data received in twice the anticipated maximum difference between propagation delays of the respective frames of each derived signal.

17. A method as claimed in claim 16, wherein the predetermined storage capacity is adequate to store a quantity of payload data received during a time interval of 250 $\mu$Sec.

18. A network node adapted to function as a start node for a hyper-concatenated connection across a network between the start node and an end node, the hyper-concatenated connection being routed through at least one independent pointer processing state machine, the network node comprising:
a) an input port adapted to receive an input signal having a user- selected variable concatenation;
b) a signal processor adapted to split the input signal across a plurality of derived signals independently of the concatenation of the input signal, the signal processor including means for inspecting an overhead of each frame of the input signal to determine whether the overhead contains a payload pointer or a concatenation indicator; and
c) an output port adapted to launch the derived signals across the network as hyper-concatenated data streams within respective ones a plurality of channels of the hyper-concatenated connection.

19. A network node as claimed in claim 18, wherein each hyper-concatenated channel has a signal bandwidth expressed as an integer M (where M$\geq$1) of frames of the derived signal to be transmitted over each respective channel.

20. A network node as claimed in claim 19, wherein M is selected from a group consisting of: 1, 2, or an integer multiple of 3.

21. A network node as claimed in claim 19, wherein the signal processor comprises:
a) means for identifying each frame within the input signal that satisfies a condition (p*M)+1, for integers p, in order to determine a split location for the input signal;

b) means for modifying each frame that satisfies the condition if an overhead of the respective frames includes a concatenation indicator; and c) means for determining a channel for transporting a frame that satisfies the condition, and each subsequent frame until a next frame satisfies the condition.

22. A network node as claimed in claim 21 wherein the means for modifying the frames that satisfy the condition is a pointer processor.

23. A network node as claimed in claim 22, wherein the pointer processor is adapted to modify the frames having an overhead that includes a concatenation indicator by:

a) inserting a split indicator into a predetermined location within the frame overhead; and b) replacing the concatenation indicator in the frame overhead with a stored payload pointer extracted from an overhead of a first frame of a concatenated signal that includes the frame meeting the condition.

24. A network node as claimed in claim 23, wherein the signal processor is adapted to determine the split location in the input signal in real-time as the input sigal is received by the network node.

25. A network node as claimed in claim 23, wherein the split indicator is inserted by assigning a predetermined value to SS bits of an H1 byte of an overhead portion of the frame.

26. A network node as claimed in claim 25, wherein the predetermined value is binary "01".

27. A network node as claimed in claim 18, wherein the input signal comprises a user- selected mix of concatenated and unconcatenated Synchronous Optical Network (SONET)/Synchronous Digital Hierarchy (SDH) signals.

28. A network node as claimed in claim 27, wherein each frame is an STS-n, where n is an integer, and n≧1.

29. A network node adapted to function as an end node for a hyper-concatenated connection between a start node and the end node, the hyper-concatenated connection being routed through independent pointer processing state machines, the network node comprising:

a) an input port adapted to receive hyper-concatenated data streams from adjacent channels, independently of a concatenation of each hyper-concatenated data stream;

b) a signal processor adapted to combine the hyper-concatenated data streams into an output signal and comprising, in respect of each hyper-concatenated data stream, a respective read controller adapted to replace a payload pointer in a received frame with a concatenation indicator if an overhead of the received frame contains a split indicator; and c) an output port adapted to transmit the output signal to a downstream node.

30. A network node as claimed in claim 29, wherein the output signal comprises a user selected mix of concatenated and unconcatenated Synchronous Optical Network (SONET)/Synchronous Digital Hierarchy (SDH) signals.

31. A network node as claimed in claim 29, wherein the signal processor further comprises, in respect of each hyper-concatenated data stream:

a) an alignment buffer adapted to buffer payload data of a respective hyper-concatenated data stream; and b) a pointer processor adapted to detect a frame received in a respective data stream and determine a location of payload data in the frame;

and wherein the read controller is responsive to the pointer processor and adapted to read the buffered payload data in an aligned condition across the channels of the hyper-concatenated connection into the concatenated output signal.

32. A network node as claimed in claim 31, wherein the pointer processor further comprises:

a) a signal monitor adapted to monitor at least an overhead portion of the respective frames; and b) means for determining whether the overhead portion contains a split indicator.

33. A network node as claimed in claim 31, further comprising a control means adapted to:

a) designate one of the hyper-concatenated data steams as a reference data stream; and b) designate all others of the hyper-concatenated data steams as slave data streams.

34. A network node as claimed in claim 33, wherein a reference read controller is adapted to control a reference read operation for reading payload data of the reference data stream from a respective reference alignment buffer so that payload data from each of the slave data streams can be read by respective slave read operations in alignment with the reference data stream.

35. A network node as claimed in claim 31, wherein the alignment buffer has a predetermined storage capacity based on an anticipated maximum difference between propagation times of the respective signals received on each hyper-concatenated data stream.

36. A network node as claimed in claim 35, wherein the predetermined storage capacity of the alignment buffer is adequate to store frame data received in a time interval equivalent to twice the anticipated maximum difference in propagation delay of the respective hyper-concatenated data streams.

37. A network node as claimed in claim 35, wherein the anticipated maximum difference in propagation delay between the respective hyper-concatenated data steams is less than a time interval required to receive a frame at the end node on any one of the hyper-concatenated data streams.

38. A network node as claimed in claim 35, wherein the predetermined storage capacity is adequate to store frame data received during a period of 250 μSec.

* * * * *

UNITED STATES PATENT AND TRADEMARK OFFICE
CERTIFICATE OF CORRECTION

| | |
|---|---|
| PATENT NO. | : 6,975,649 B1 |
| APPLICATION NO. | : 09/577814 |
| DATED | : December 13, 2005 |
| INVENTOR(S) | : Kim B. Roberts et al. |

It is certified that error appears in the above-identified patent and that said Letters Patent is hereby corrected as shown below:

Column 8, lines 32-44 should be deleted – duplication of column 14 lines 26-38.

Column 17, line 43 "copses" should read – comprises--.

Signed and Sealed this

Eighth Day of August, 2006

JON W. DUDAS
*Director of the United States Patent and Trademark Office*